United States Patent [19]

Jeffries

[11] 4,005,611
[45] Feb. 1, 1977

[54] CHAINLESS BICYCLE DRIVE MECHANISM

[76] Inventor: Warren E. Jeffries, 4859 Cheyenne Ave. SE., Canton, Ohio 44707

[22] Filed: Apr. 5, 1976

[21] Appl. No.: 673,665

[52] U.S. Cl. .................................. 74/416; 280/236
[51] Int. Cl.² ....................... F16H 1/12; B62M 9/00
[58] Field of Search .............. 74/416, 417; 280/236

[56] References Cited
UNITED STATES PATENTS

| | | | |
|---|---|---|---|
| 628,614 | 7/1899 | Smallwood | 74/417 |
| 2,561,960 | 7/1951 | Weaver | 74/449 |
| 2,780,110 | 2/1957 | Kopa | 74/416 |
| 3,782,210 | 1/1974 | Holleman | 280/236 |
| 3,872,736 | 3/1975 | Houvouras | 74/416 |
| 3,934,481 | 1/1976 | Foster | 280/236 |

*Primary Examiner*—Samuel Scott
*Assistant Examiner*—Allan R. Bucke

[57] ABSTRACT

A chainless drive mechanism for a bicycle using a rotatable drive shaft for transferring the pedal actuated driving force from the pedal crankshaft to the rear wheel including shift mechanisms to provide different drive ratios. A pair of discs, each formed with a plurality of concentric series of openings, are mounted on the pedal crankshaft and rear wheel, respectively. A pair of spaced sprocket gears is rotatably mounted on each end of the drive shaft and engaged with a respective series of disc openings. A pair of axially movable ratchet slip gears is fixed against rotation on each end of the drive shaft adjacent a similar ratchet surface formed on each of the sprocket gears. A pair of operator controlled individual shift brackets is movably mounted on the drive shaft, each being operatively engageable with a respective pair of ratchet slip gears. Axial movement of the shift brackets along the drive shaft selectively intermeshes one of the ratchet gears with the ratchet surface of its respective sprocket gear to drivingly connect the front disc with the rear disc through the drive shaft and selected ratchet and slip gears upon rotation of the pedal crankshaft. The intermeshing gears on the rear wheel, slip automatically upon stopping or slowing down of the rotation of the pedal crankshaft and drive shaft, permitting continued rotation of the rear wheel during coasting of the bicycle. Spring means bias return the selected rear wheel ratchet gear into intermeshing driving engagement upon resumption of rotation of the pedal crankshaft.

20 Claims, 12 Drawing Figures

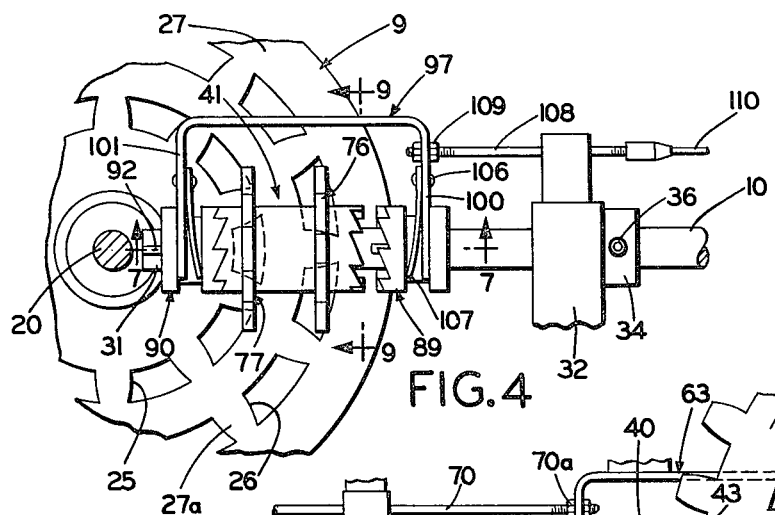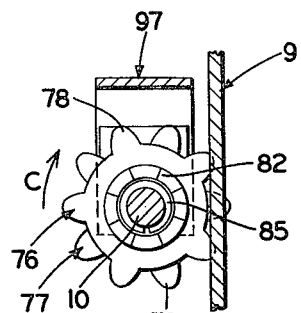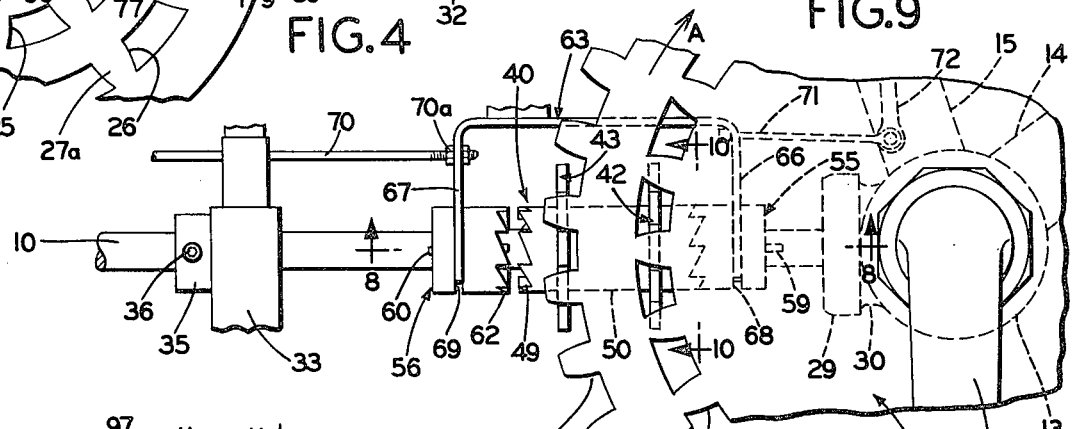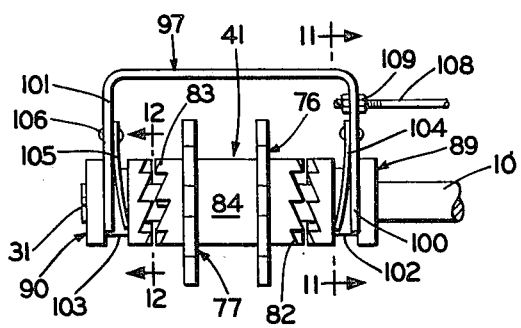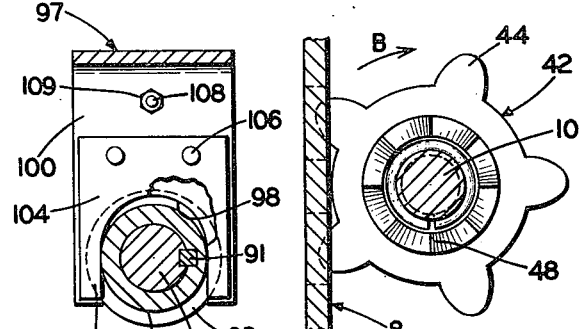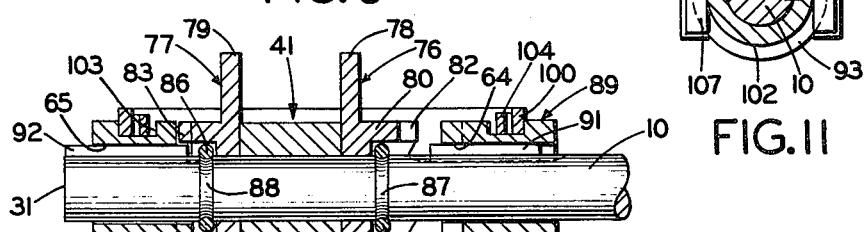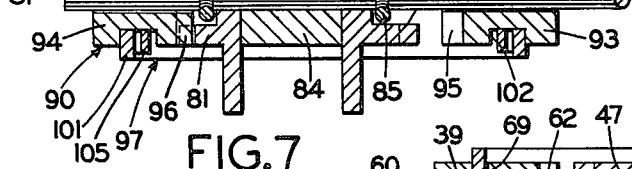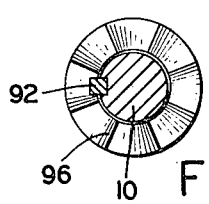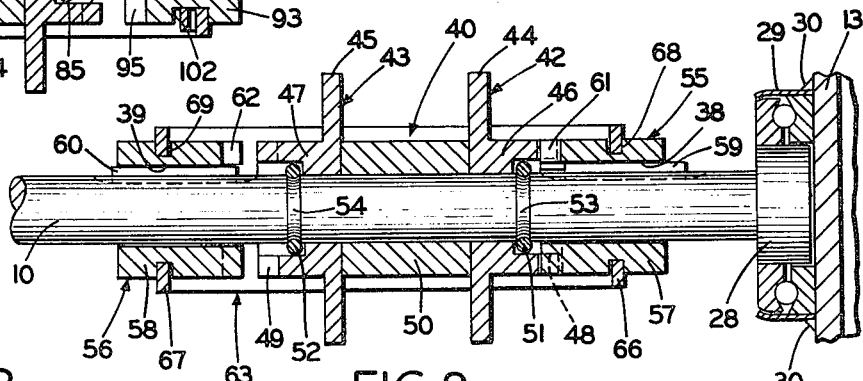

CHAINLESS BICYCLE DRIVE MECHANISM

BACKGROUND OF THE INVENTION

1. Field of the Invention

The invention relates to bicycle drive mechanisms, and in particular to a chainless drive mechanism for transmitting the pedal actuated driving force to the rear wheel. More particularly, the invention relates to a chainless bicycle drive mechanism using a rotatable drive shaft having a shiftable transmission gear system for changing the drive or gear ratio, which includes a coaster mechanism external of the rear wheel axle.

2. Description of the Prior Art

Multispeed bicycles have become ever increasingly popular in the past several years and are accounting for a large portion of bicycle sales. The speed advantages and ease of operation of these multispeed bicycles are some of the main factors increasing their popularity. The most common multispeed transmission for these bicycles is the derailleur gear chain drive system. The derailleur chain drive system comprises a plurality of sprockets of various sizes mounted on the rear wheel shaft in combination with a shifting mechanism which causes the chain to move from one sprocket to another, together with a spring actuated device to adjust and maintain the correct tension in the chain. The various sizes of the drive sprockets provide for the selection of a desired gear ratio depending upon the particular terrain over which the bicycle is being driven.

Such derailleur systems, however, are relatively expensive, complex and are subject to substantial maintenance problems due to the use of a chain and the continual movement of the chain between sprockets to achieve the desired gear ratio.

Another type of multispeed drive mechanism for bicycles is known as the "chainless" type. This mechanism uses a shaft instead of a chain for transmitting the pedal actuated driving force to the rear wheel. Various types and arrangements of chainless bicycle drive mechanisms have been developed in the past which use such drive shafts for transmitting the driving force supplied by an operator through the pedal actuated crankshaft to the rear wheel. Many of these mechanisms use expensive bevel or angled gears which intermesh with ring gears mounted on the rear wheel axle or pedal crankshaft. Examples of such prior mechanisms are shown in U.S. Pats. Nos. 479,470, 506,685, 589,266, 614,969, 624,964, 649,878, 1,334,108 and 2,378,634.

These mechanisms also are provided with means for shifting the intermeshing gears selectively into engagement with a selected ring gear to affect the gear change or speed ratio adjustment. Another known type of chainless multispeed bicycle drive mechanism is shown in U.S. Pat. No. 3,863,503, which uses an axially adjustable two piece drive shaft having gears on the ends thereof, which gears selectively engage concentric gear teeth formed on a pair of front and rear discs.

Various problems exist with such known constructions in that the concentric gear rings or teeth on the discs are expensive to produce since they require elaborate machining and manufacturing procedures. Likewise, the intermeshing gears are of the expensive beveled or angled type which further increases the cost of the bicycle.

One of the main disadvantages of known chainless bicycle drive mechanisms, with or without gear ratio changing ability, is the coaster mechanism which permits the bicycle to coast freely upon stopping of the pedal action. Many of the mechanisms set forth in the patents listed above require a manual manipulation to be performed by the operator to disengage the meshing gears when starting to coast in order to stop rotation of the drive shaft and to enable the rear wheel to continue to rotate freely upon stopping of the pedal movement. In order to eliminate this problem, mechanisms such as shown in U.S. Pat. No. 3,863,503, continue to utilize a pressure sensitive ratchet arrangement mounted within the hub of the rear wheel. This arrangement is a standard component on most single or multispeed bicycles in use today, but again increases the cost and maintenance of the bicycle.

Therefore, the need has existed for a chainless bicycle drive mechanism having a variable speed and gear changing arrangement, the components of which can be produced inexpensively without expensive machining operations, which permits the bicycle to "free coast" without any manual operation or gear changing being required by the operator and without the use of a pressure sensitive ratchet arrangement within the rear hub, and which automatically stops the rotation of the front disc and connecting drive shaft upon stopping of the pedal motion, without affecting the continued rotation of the rear wheel and free coasting of the bicycle. No known chainless bicycle drive mechanism of which I am aware provides these features in a simple, relatively inexpensive and rugged mechanism.

SUMMARY OF THE INVENTION

Objectives of the invention include providing a chainless bicycle drive mechanism using a rigid shaft for transmitting the pedal actuated drive force from the pedal crankshaft to the rear wheel, which mechanism includes shiftable gears mounted on the shaft which are selectively engageable with concentric circular series of openings formed in front and rear discs to provide multispeed operation or gear ratios for the bicycle; providing such a chainless bicycle drive mechanism having ratchet slip gears mounted on the drive shaft which are engageable with the power transmitting sprocket gears which automatically disengage the drive shaft from the rear wheel enabling the bicycle to free coast upon stopping of the pedal action thereby reducing friction-producing motion between the drive components during coasting, and which eliminates the usual pressure ratchet mechanism in the rear wheel hub; providing such a chainless bicycle drive mechanism in which the sprocket gear engaging discs are stamped from sheet metal and formed with a plurality of concentric circularly arranged series of openings in the discs which are selectively engageable with the sprocket gears to achieve the multispeed feature, eliminating the expensive machining and forming of such discs used in prior chainless multispeed bicycle drive mechanisms; and providing such a bicycle drive mechanism which is of a relatively simple, inexpensive and rugged construction, which eliminates difficulties heretofore encountered, achieves the stated objectives simply and effectively, and which solves problems and staisfies existing needs.

These objectives and advantages are obtained by the multispeed, chainless bicycle drive mechanism of the invention, the general nature of which may be stated as including a drive disc mounted on a pedal actuated crankshaft of the bicycle for rotation with the crankshaft, said drive disc being formed with a pair of circularly arranged series of openings concentric with the crankshaft; a driven disc mounted on a rear wheel of the bicycle for rotation with the rear wheel, said driven disc being formed with a pair of circularly arranged series of openings concentric with the axis of the rear wheel; rigid drive shaft means extending between the drive and driven discs for transmitting the rotating force from the crankshaft to the vehicle rear wheel; first and second sprocket means rotatably mounted on the drive shaft means, each of said sprocket means having outer circumferential teeth and a series of ratchet teeth, with the circumferential teeth being engageable with a respective series of disc openings for rotating said sprocket means upon rotation of the drive disc in a forward direction; first and second ratchet gear means mounted on the drive shaft means and operatively engageable with the first and second sprocket means, respectively, said ratchet gear means being rotatable with the drive shaft means and axially movable with respect thereto; first shift means operatively engageable with the first and second ratchet gear means for selectively engaging one of said ratchet gear means with the ratchet teeth of its respective sprocket gear means by movement of the selected ratchet gear means axially along the drive shaft means to drivingly connect the selected ratchet gear means and sprocket gear means with the drive disc and the drive shaft means; third and fourth sprocket means rotatably mounted on the drive shaft means, each of said sprocket means having outer circumferential teeth and a series of ratchet teeth, with the circumferential teeth being engageable with a respective series of disc openings for rotating said driven disc upon rotation of the sprocket means and drive shaft means in a forward direction; third and fourth ratchet gear means mounted on the drive shaft means and operatively engageable with the third and fourth sprocket means, respectively, with said ratchet gear means being rotatable with the drive shaft means and axially movable with respect thereto; second shift means operatively engageable with the third and fourth ratchet gear means for selectively engaging one of said ratchet gear means with the ratchet teeth of its respective sprocket gear means by movement of the selected ratchet gear means axially along the drive shaft means to drivingly connect the drive shaft means with the driven disc for imparting rotation to the vehicle rear wheel upon rotation of the drive shaft means; and spring means biasing the third and fourth ratchet gear means toward driving engagement with the ratchet teeth of their respective sprocket gear means, with said selected ratchet gear means overcoming the bias of the spring means and moving out of driving engagement with its respective sprocket gear means upon the drive shaft means and ratchet gear means becoming stationary, permitting the sprocket gear means to continue to rotate freely with respect to the drive shaft means during free coasting of the bicycle rear wheel.

BRIEF DESCRIPTION OF THE DRAWINGS

A preferred embodiment of the invention — illustrative of the best mode in which applicant has contemplated applying the principle — is set forth in the following description and shown in the accompanying drawings, and is particularly and distinctly pointed out and set forth in the appended claims.

FIG. 4 is an enlarged fragmentary view of the bicycle rear wheel shifter and coaster mechanism;

FIG. 5 is an enlarged fragmentary view of the shifter mechanism engageable with the pedal driven shaft;

FIG. 6 is a fragmentary elevational view of the shifter and coaster mechanism of FIG. 4, shown in coasting position;

FIG. 7 is an enlarged fragmentary sectional view taken on line 7—7, FIG. 4;

FIG. 8 is an enlarged fragmentary sectional view taken on line 8—8, FIG. 5;

FIG. 9 is a fragmentary sectional view taken on line 9—9, FIG. 4;

FIG. 10 is an enlarged fragmentary sectional view taken on line 10—10, FIG. 5;

FIG. 11 is an enlarged fragmentary sectional view taken on line 11—11, FIG. 6; and FIG. 12 is an enlarged sectional view taken on line 12—12, FIG. 6.

Similar numerals refer to similar parts throughout the drawings.

DESCRIPTION OF THE PREFERRED EMBODIMENT

Figure 1:
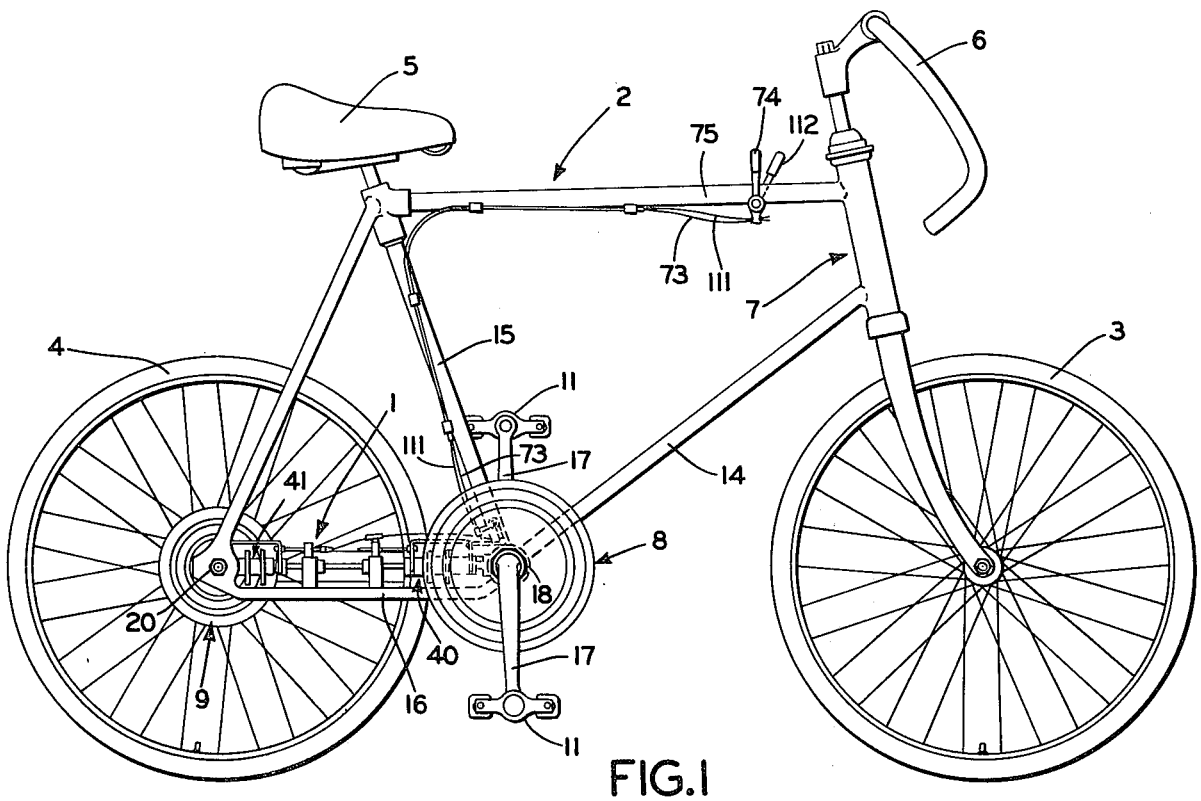
FIG. 1 is a side elevational view of a bicycle with the improved chainless drive system mounted thereon.

The improved chainless bicycle drive mechanism is indicated generally at 1, and is shown in FIG. 1 mounted on a usual bicycle 2. Bicycle 2 is of a usual construction having front and rear wheels 3 and 4, a seat 5, handle bars 6 and a frame indicated generally at 7.

Improved drive mechanism 1 includes a front drive disc 8 and a rear driven disc 9, which are operatively connected by a rigid drive shaft 10 for transmitting the driving force applied to bicycle pedals 11 to rear wheel 4. Drive disc 8 is rigidly mounted on a pedal crankshaft 12 by a nut 18, with crankshaft 12 being rotatably mounted within a crankshaft housing 13. Housing 13 is located at the junction of diagonal frame member 14, vertical frame member 15 and horizontal frame member 16, as in a usual bicycle construction. Pedal shafts 17 extend vertically in opposite directions from crankshaft 12. Thus, drive disc 8 is rotatable with pedal actuated crankshaft 12, as in a usual chain driven bicycle. Driven disc 9, in turn, is rigidly mounted on rear wheel hub 19 (FIG. 3) which is rotatably mounted by bearings on rear axle 20.

Drive disc 8 is formed with a pair of circularly arranged inner and outer series of openings 21 and 22 which are concentric with respect to the center of disc 8 and crankshaft 12. Outer openings 22 may be formed by adjacent pairs of teeth-like projections 23, with inner openings 21 having somewhat rectangular configurations. Driven disc 9 is formed with a pair of circularly arranged inner and outer series of openings 25 and 26, concentric with respect to the center of disc 9 and rear axle 20. The outer series of openings 26 may be enclosed by an annular ring 27 or may be formed by teeth-like projections 27a similar to teeth 23 of drive disc 8, if ring 27 is eliminated, without affecting the invention.

Figure 3:
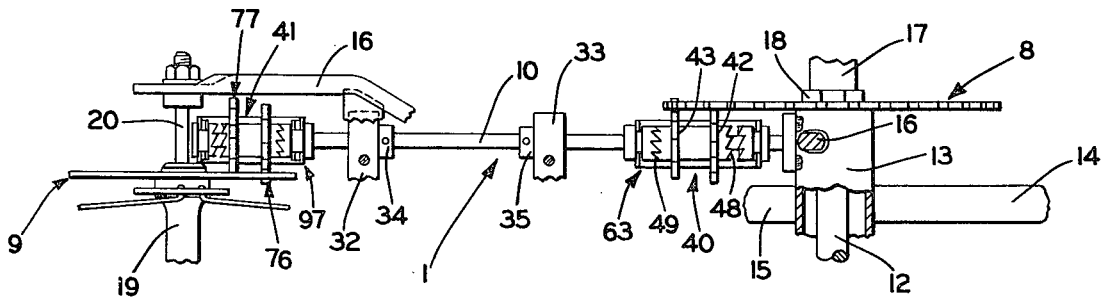
FIG. 3 is a fragmentary sectional view taken on line 3—3, FIG. 2.

Discs 8 and 9 are flat having generally uniform thicknesses, as shown in FIG. 3, eliminating raised projections or gear rings as in prior constructions, and can be stamped easily and inexpensively from flat sheet metal, eliminating costly machining heretofore required. Drive disc 8 preferably is larger than rear driven disc 9 with the diameters of the series of openings 21 and 22 being larger than the diameter of the series of openings 25 and 26 of driven disc 9. The diameters of the series of disc openings can be varied depending upon the desired gear ratio.

Drive shaft 10 is a rigid cylindrical bar-like member extending between crankshaft housing 13 and rear axle 20. The forward end of shaft 10 preferably is formed with an enlarged knob 28 (FIG. 8). Knob 28 is mounted within a circular roller bearing 29 which is attached by welds 30 to crankshaft housing 13, to provide stability to shaft 10. The opposite end 31 of shaft 10 terminates adjacent to and spaced from rear axle 20, as shown in FIG. 3.

A pair of supporting brackets 32 and 33 are mounted on horizontal frame member 16 (FIG. 2) and extend upwardly therefrom. Each bracket preferably has an internal bearing (not shown) through which shaft 10 extends for rotatably supporting shaft 10, and to minimize the friction therebetween. Retaining collars 34 and 35 are mounted on shaft 10 and are fixed adjacent to brackets 32 and 33, respectively, by set screws 36 to prevent axial movement of shaft 10 with respect to frame member 16 and brackets 32 and 33.

In accordance with the invention, shift mechanisms indicated generally at 40 and 41, are mounted on the front and rear portions of drive shaft 10 adjacent to and operatively engageable with discs 8 and 9, respectively, for changing the gear or drive ratio of bicycle 2. Front shift mechanism 40 (FIGS. 5 and 8) includes a pair of sprocket gears 42 and 43 which are freely rotatably mounted on shaft 10. Gears 42 and 43 are similar, having outer circumferential series of gear teeth 44 and 45, with integral axially extending sleeve-like hubs 46 and 47 which terminate in annular rings of ratchet teeth 48 and 49, respectively. A spacer 50 is rotatably mounted on shaft 10 between sprocket gears 42 and 43. Retaining rings 51 and 52 are seated in grooves 53 and 54, respectively, which are formed in shaft 10, and are located within the interior of hubs 46 and 47 to prevent axial movement of gears 42 and 43 along shaft 10 (FIG. 8). Sprocket gears 42 and 43 are positioned on shaft 10 by retaining rings 51 and 52, whereby gear teeth 44 and 45 are engaged within disc openings 21 and 22, respectively. Accordingly, rotation of disc 8 will in turn cause rotation of both sprocket gears 42 and 43.

Shift mechanism 40 further includes a pair of ratchet slip gears 55 and 56 which are telescopically mounted on shaft 10. Gears 55 and 56 have cylindrical bodies 57 and 58 which are formed with ratchet teeth rings 61 and 62, respectively, at one end thereof. Teeth 61 and 62 are concentric with shaft 10 and are located in face-to-face relationship with ratchet teeth 48 and 49 of sprocket gears 42 and 43, respectively. Slip gears 55 and 56 are fixed against rotation with respect to shaft 10 by keys 59 and 60 which project into slots 38 and 39, formed in gear bodies 57 and 58. Gears 55 and 56 are prevented from rotation with respect to shaft 10, but are freely movable in an axial direction by this key-slot arrangement.

A U-shaped shift bracket 63 is movably mounted on shaft 10 by location of shaft 10 within U-shaped notches formed in bracket legs 66 and 67, such as shown in FIG. 11. Bracket legs 66 and 67 project into circular grooves 68 and 69 formed in cylindrical bodies 57 and 58 of ratchet slip gears 55 and 56, respectively (FIGS. 5 and 8). A stabilizing rod 70 extends between bracket leg 67 and support bracket 33 (FIG. 5) for supporting shift bracket 63. Rod 70 is attached by nuts 70a to leg 67 and is movably mounted with respect to bracket 33 for axial movement therethrough. A shift rod 71 extends forwardly from bracket leg 66 and is connected to a bellcrank 72 (FIGS. 2 and 5) which is mounted on bicycle frame member 15. A cable 73 operatively connects bellcrank 72 with an operator shift control lever 74 pivotally mounted on bicycle frame crossbar 75 (FIG. 1).

In further accordance with the invention, rear shift mechanism 41 (FIGS. 4, 6 and 7) includes a pair of sprocket gears 76 and 77 which are rotatably mounted on shaft 10. Gears 76 and 77 are similar to each other and to sprocket gears 42 and 43 of shift mechanism 40. The gears include outer circumferential gear teeth 78 and 79 and axially extending hubs 80 and 81. Hubs 80 and 81 terminate in annular rings of ratchet teeth 82 and 83, respectively. Gears 76 and 77 are separated by a spacer 84 which is rotatably journalled on shaft 10.

Figure 2:
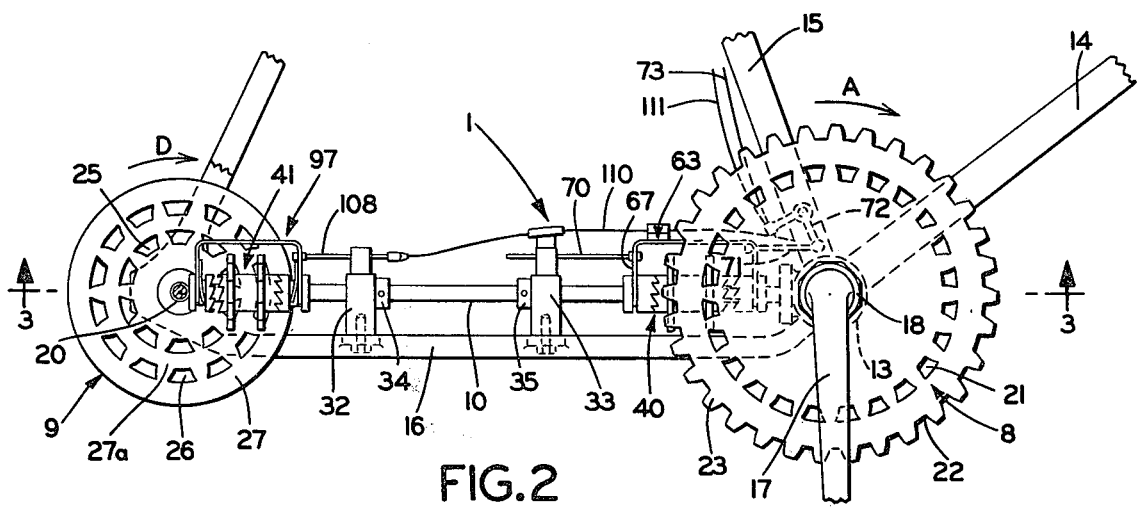
FIG. 2 is an enlarged fragmentary side elevational view with portions broken away of the improved drive system.

Retaining rings 85 and 86 are seated within grooves 87 and 88 formed in shaft 10, and are positioned within the interior of gear hubs 80 and 81. Rings 85 and 86 properly position gears 76 and 77 on shaft 10 so that teeth 78 and 79 are engaged with disc openings 26 and 25, respectively, and to prevent axial movement of the gears along shaft 10. Accordingly, rotation of gears 76 and 77 on shaft 10 in clockwise or forward direction, as seen in FIG. 9, will in turn, rotate rear disc 9 in a forward or clockwise direction (FIGS. 1, 2 and 4).

A pair of ratchet slip gears 89 and 90 are telescopically mounted on shaft 10. Slip gears 89 and 90 are fixed against rotation with respect to shaft 10 by keys 91 and 92 which project into slots 64 and 65 which are formed in the cylindrical-shaped bodies 93 and 94, respectively, of the gears. This key-slot arrangement permits axial movement of slip gears 89 and 90 along shaft 10, but prevents rotation with respect thereto, as in ratchet gears 55 and 56 of front shift mechanism 40. Slip gears 89 and 90 are formed with rings of ratchet teeth 95 and 96, respectively, at one end thereof, which are concentric with shaft 10 and are located in face-to-face relationship with ratchet teeth 82 and 83 of sprocket gears 76 and 77, respectively.

A U-shaped shift bracket 97, similar to shift bracket 63 is movably mounted on shaft 10 by U-shaped notches 98 formed in bracket legs 100 and 101, respectively (FIG. 11). Bracket legs 100 and 101 project into circular grooves 102 and 103, formed in cylindrical bodies 93 and 94 of slip gears 89 and 90, respectively (FIGS. 6, 7 and 11). Grooves 102 and 103 have a wider axial length than do corresponding grooves 68 and 69 of slip gears 55 and 56 for the reasons discussed below. Leaf springs 104 and 105 are attached by rivets 106 on bracket legs 100 and 101, and have U-shaped lower ends 107 which extend about shaft 10 and cylindrical bodies 93 and 94 of the slip gears. Springs 104 and 105 bias slip gears 89 and 90 inwardly toward each other and into meshing engagement with ratchet teeth 82 and 83 of sprocket gears 76 and 77, respectively.

A shift rod 108 is attached to bracket leg 100 by nuts 109 and is slidably supported within shaft bracket 32 (FIG. 4) and is connected by a control cable 110 to a second bellcrank (not shown) mounted on frame member 15 opposite bellcrank 72. Cable 110 preferably is slidably supported on the top of bracket 33 and on top of shift bracket 63 (FIG. 2). This second bellcrank, in turn, is connected by a cable 111 (FIG. 1) to a second operator control shift lever 112 mounted on crossbar 75 adjacent lever 74.

Ratchet teeth 48, 49, 61, 62, 82, 83, 95 and 96 have usual slip washer and gear configurations with each tooth having an axially extending surface and an angled surface meeting at a point or tooth crest. The axially extending surfaces of opposed teeth are in driving abutment upon rotation of one of the gears in one direction enabling the rotating ratchet gear to drive or rotate the opposite gear. When the drive gear stops or slows down, the slopes of the angled surfaces permit the angled surfaces of the faster rotating driven gear to ride over or "slip" past the corresponding angled surfaces of the stationary or slower drive gear.

The operation, and the features and advantages obtained thereby, of chainless drive mechanism 1 are described below. FIGS. 2 and 3 show shift mechanisms 40 and 41 and sprocket gears 43 and 76 in driving engagement with the outer series of openings 22 and 26 of discs 8 and 9, respectively. In these positions, U-shaped shift brackets 63 and 97 have been moved axially outwardly by rods 71 and 108 toward pedal crankshaft 12 and rear axle 20, respectively. This axial movement of shift brackets 63 and 97 moves ratchet slip gears 56 and 89 axially along shaft 10 until their corresponding ratchet teeth 62 and 95 mesh with ratchet teeth 49 and 82 of sprocket gears 43 and 76, respectively. This engagement of the respective ratchet teeth drivingly connects shaft 10 with discs 8 and 9 through sprocket gears 43 and 76.

These positions of shift brackets 63 and 97 correspondingly move ratchet slip gear 55 out of engagement with sprocket gear 42, and ratchet slip gear 90 out of engagement with sprocket gear 77, as shown in FIGS. 2 and 3. Correspondingly, leaf spring 104 is in partially compressed position biasing ratchet slip gear 89 into engagement with sprocket gear 76.

Rotation of crankshaft 12 in a forward direction by actuation of pedals 11, rotates disc 8 in a forward or clockwise direction, indicated by arrow A, FIGS. 2 and 5, which in turn rotates both sprocket gears 42 and 43 in a clockwise direction (arrow B) when viewing FIG. 10. Rotation of sprocket gear 43, correspondingly, rotates slip gear 56 through the driving engagement of the axially extending surfaces of teeth 49 and 62, which in turn rotates shaft 10 due to the coupling between slip gear 56 and shaft 10 by key 60. The rotation of shaft 10 drives or rotates slip gears 89 and 90 by the coupling of keys 91 and 92 within slots 64 and 65. Gear 89 in turn rotates sprocket gear 76 through the meshing engagement of the abutting axially extending surfaces of teeth 95 and 82, respectively. The rotation of sprocket gear 76 in a clockwise direction, when viewing FIG. 9 (arrow C), in turn rotates rear disc 9 in a clockwise direction (arrow D, FIG. 2) through the engagement of sprocket gear teeth 78 in disc openings 26. Rotation of disc 9 in turn rotates rear wheel 4 in a forward direction through rear wheel hub 19. This rotation of disc 9, in turn, will impart rotation to sprocket gear 77 through engagement of teeth 79 with inner disc openings 25. The rotation of sprocket gear 77, however, will have no effect on the other components of shift mechanism 41 due to the disengagement of ratchet slip gear 90 with sprocket gear 77 by the selected position of shift bracket 97.

In accordance with one of the main features of the invention, rear shift mechanism 41 provides for the free coasting of bicycle 2 and of rear wheel 4, automatically and immediately upon stopping or sufficiently decreasing of the pedal action or rotation of crankshaft 12 and disc 8. Likewise, sprocket gears 42 and 43, and shaft 10 stop rotating simultaneously with the stopping of disc 8. Rear wheel 4, however, continues to rotate due to the slipping occurring between the angled surfaces of teeth 95 and 82 of ratchet gear 89 and sprocket gear 76. Continued rotation of sprocket gear 76 permits the sloped meshing teeth to slip over and past the corresponding teeth of ratchet gear 89. Ratchet gear 89 moves along shaft 10 an axial distance equal to the height of the intermeshing teeth, fully compressing the heretofore partially compressed spring 104. Rear wheel 4, therefore, continues to rotate freely in a forwardly direction with only the slight frictional force occurring between the slipping of the sloped surfaces of teeth 95 and 82. Accordingly, the remaining components of shaft 10, shift mechanism 40 and disc 8 remain stationary or at a considerably reduced speed. The coasting position of shift mechanism 41 is shown in FIG. 6.

Immediately upon resumption of the pedaling action, shaft 10 begins to rotate or increase in speed through gears 43 and 56, with the axial surfaces of teeth 95 of ratchet gear 89 continuing to drivingly engage the axial surfaces of teeth 82 of sprocket gear 76. Spring 104 insures this driving engagement by the biasing force asserted thereby on gear 89.

Operation of shift levers 74 and 112, individually or together, move shift brackets 63 and 97 axially inwardly toward each other along shaft 10, moving shift mechanisms 40 and 41 from the driving positions of FIGS. 2 and 3 to the opposite driving positions of FIGS. 4 and 5. In these positions, sprocket gears 42 and 77 are drivingly engaged with inner openings 21 and 25 of discs 8 and 9, respectively, with associated sprocket gears 43 and 76 assuming idling or freely rotating positions.

The details of shift mechanisms 40 and 41 for these inner positions are shown particularly in FIGS. 8 and 7, respectively. Ratchet slip gears 55 and 90 are moved by bracket legs 66 and 101 into driving engagement with sprocket gears 42 and 77, respectively. Ratchet teeth 61 of gear 55 mesh with ratchet teeth 48 of gear 42 (FIG. 8) and ratchet teeth 96 of gear 90 mesh with teeth 83 of gear 77 (FIG. 7) in these positions.

Rotation of crankshaft 12 in a forward direction rotates disc 8 in a forward direction together with sprocket gears 42 and 43, as discussed above. Rotation of sprocket gear 42, correspondingly, rotates slip gear 55 through the driving engagement of teeth 48 and 61, which in turn rotates shaft 10 through the coupling engagement of key 59 and slot 38. Rotation of shaft 10 in turn rotates rear disc 9 in the forward direction through the engagement of gear teeth 79 in disc openings 25 through the intermeshing of ratchet teeth 83 of gear 77 with teeth 96 of slip gear 90. The rotation of sprocket gear 76 by the rotation imparted to disc 9 will have no effect on the other components of shift mechanism 41 due to the disengagement of ratchet slip gear 89 with sprocket gear 76 by the axial movement of shift bracket 97.

The same free coasting feature discussed above is provided automatically and simultaneously upon stopping or slowing down of the pedal action and rotation of shaft 10. The sloped surfaces of ratchet teeth 83 and 96 slip with respect to each other upon axial movement of ratchet slip gear 90 away from sprocket gear 77, compressing spring 105. Spring 105 biases ratchet gear 90 into driving engagement with sprocket gear 77 immediately upon resumption of the pedaling action and increased rotation of shaft 10.

Shift mechanisms 40 and 41 need not be operated together as described above, but can be operated individually whereupon sprocket gear 42 is drivingly engaged with the inner series of openings 21 (FIG. 8) with sprocket gear 76 being drivingly engaged with the outer series of openings 26 in rear disc 9, as shown in FIGS. 2 and 3, and vice versa. Again, rear shift mechanism 41 will provide for the free coasting of the bicycle with the subsequent stopping of shaft 10, disc 8 and the rotary components of shift mechanism 40. Thus, various drive gear ratios can be achieved by movement of shift mechanism 40 and 41 between their inner and outer positions and any combination thereof.

Discs 8 and 9 are offset on opposite sides of the axis of shaft 10, as shown in FIG. 3, whereby rotation of disc 8 in a forward direction also will rotate disc 9 in a forward direction by the corresponding rotation of the sprocket gears. Also, the particular location and position of the shift mechanism components are important in order to provide for the slipping action of the associated gears in rear shift mechanism 41, permitting continued forward rotation of disc 9 and rear wheel 4, simultaneously and automatically upon stopping or slowing down the rotation of disc 8.

The particular shift actuating mechanisms of the pair of bellcranks and associated rods 71-108 and cables 73-111 need not have the particular configuration shown in the drawings, but can be operated by other means in order to move shift brackets 63 and 97 axially along shaft 10 without departing from the concept of the invention.

The improved chainless bicycle drive mechanism, described above and shown in the drawings, has a number of important and advantageous features. The incorporation of the coasting feature in rear shift mechanism 41 eliminates the need of a coasting mechanism within the rear wheel hub as in known bicycle constructions, thereby permitting an inexpensive rear wheel hub 19 to be used, reducing the cost of the bicycle. The various components of mechanism 1 can be produced relatively inexpensively, especially discs 8 and 9, which are stamped from sheet metal, eliminating costly machining procedures as required for prior disc and gear arrangements for known chainless bicycle drive systems. Furthermore, the coasting feature of rear shift mechanism 41 eliminates rotation of shaft 10 and the components of front shift mechanism 40 automatically upon stopping of disc 8 during free coasting of the bicycle, eliminating any manipulation being performed by the bicycle rider and reducing friction and drag on the bicycle movement.

It can be readily understood that by making a few minor modifications, the chainless drive mechanisms can be used for drivingly connecting a front drive disc with a rear driven disc, which discs may be formed with only a single series of openings in each disc and with the shift mechanisms eliminated to provide a chainless bicycle drive mechanism for a single speed bicycle which still retains the coaster mechanism operatively connected with the rear disc.

Accordingly, the improved chainless bicycle drive construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the chainless bicycle drive mechanism is constructed and used, the characteristics of the construction, and the advantageous, new and useful results obtained; the new and useful structures, devices, elements, arrangements, parts, and combinations, are set forth in the appended claims.

I claim:
1. A multispeed, chainless drive mechanism for a bicycletype vehicle including:
   a. a drive disc mounted on a pedal actuated crankshaft of the vehicle for rotation with said crankshaft, said drive disc being formed with a pair of circularly arranged series of openings concentric with the crankshaft;
   b. a driven disc mounted on a rear wheel of the vehicle for rotation with said rear wheel, said driven disc being formed with a pair of circularly arranged series of openings concentric with the axis of the rear wheel;
   c. rigid drive shaft means extending between the drive and driven discs for transmitting the rotating force from the crankshaft to the vehicle rear wheel;
   d. first and second sprocket means rotatably mounted on the drive shaft means, each of said sprocket means having outer circumferential teeth and a series of ratchet teeth, with said circumferential teeth being engageable with a respective series of disc openings for rotating said sprocket means upon rotation of the drive disc in a forward direction;
   e. first and second ratchet gear means mounted on the drive shaft means and operatively engageable with the first and second sprocket means, respectively, with said ratchet gear means being rotatable with the drive shaft means and axially movable with respect thereto;
   f. first shift means operatively engageable with the first and second ratchet gear means for selectively engaging one of said ratchet gear means with the ratchet teeth of its respective sprocket gear means by movement of the selected ratchet gear means axially along the drive shaft means to drivingly connect the selected ratchet gear means and sprocket gear means with the drive disc and the drive shaft means;
   g. third and fourth sprocket means rotatably mounted on the drive shaft means, each of said sprocket means having outer circumferential teeth and a series of ratchet teeth, with said circumferential teeth being engageable with a respective series of disc openings for rotating said driven disc upon rotation of said sprocket means and drive shaft in a forward direction;

h. third and fourth ratchet gear means mounted on the drive shaft means and operatively engageable with the third and fourth sprocket means, respectively, with said ratchet gear means being rotatable with the drive shaft means and axially movable with respect thereto; and i. second shift means operatively engageable with the third and fourth ratchet gear means for selectively engaging one of said ratchet gear means with the ratchet teeth of its respective sprocket gear means by movement of the selected ratchet gear means axially along the drive shaft means to drivingly connect the drive shaft means with the driven disc for imparting rotation to the vehicle rear wheel upon rotation of the drive shaft means.

2. The mechanism defined in claim 1 in which the second shift means includes spring means; in which said spring means bias the third and fourth ratchet gear means toward driving engagement with their respective sprocket gear means; and in which the selectively engaged third or fourth ratchet gear means moves axially along the drive shaft means overcoming the bias of the spring means upon the drive shaft means and ratchet gear means becoming stationary to disengage said selected ratchet gear means from its sprocket gear means permitting said sprocket gear means to rotate freely on the drive shaft means during continued coasting rotation of the vehicle rear wheel.

3. The mechanism defined in claim 1 in which the first and second ratchet gear means each have a cylindrical body telescopically mounted on the drive shaft means with a ring of ratchet teeth formed on one end thereof concentric with said drive shaft means; and in which the first and second sprocket gear means ratchet teeth are circularly arranged and concentric with respect to the drive shaft means.

4. The mechanism defined in claim 3 in which the first shift means includes a U-shaped bracket having spaced legs; in which each of the bracket legs is engaged with a respective one of the first and second ratchet gear means; and in which the first and second sprocket gear means are located between said first and second ratchet gear means.

5. The mechanism defined in claim 1 in which the third and fourth ratchet gear means each have a cylindrical body telescopically mounted on the drive shaft means with a ring of ratchet teeth formed on one end thereof, concentric with said drive shaft means; and in which the third and fourth sprocket gear means ratchet teeth are circularly arranged and concentric with respect to the drive shaft means.

6. The mechanism defined in claim 5 in which the second shift means includes a U-shaped bracket having spaced legs; in which each of the bracket legs is engaged with a respective one of the third and fourth ratchet gear means; and in which the third and fourth sprocket gear means are located between said third and fourth ratchet gear means.

7. The mechanism defined in claim 6 in which spring means is mounted on each of the bracket legs; and in which the spring means bias the third and fourth ratchet gear means toward meshing engagement with the ratchet teeth of the third and fourth sprocket gear means.

8. The mechanism defined in claim 6 in which groove means is formed in each of the cylindrical bodies of the third and fourth ratchet gear means with the spaced bracket legs being slidably mounted within said groove means; and in which the spring means are leaf springs which extend into the groove means and engage the third and fourth ratchet gear means to bias said ratchet gear means inwardly toward each other and toward meshing engagement with their respective sprocket gear means.

9. The mechanism defined in claim 1 in which the drive and driven discs are formed of stamped sheet metal.

10. The mechanism defined in claim 1 in which all of the sprocket gear means are similar, each having a disc-shaped body with the circumferential teeth being formed on the periphery thereof, and a cylindrical hub extending axially along and concentric to the drive shaft means; in which the ratchet teeth are formed on the extended ends of the hubs; and in which a retaining ring is mounted within each of the hubs and seated within a groove formed in the drive shaft means to control axial movement of the sprocket gear means.

11. The mechanism defined in claim 10 in which spacer means is journalled on the drive shaft means between each pair of sprocket gear means.

12. The mechanism defined in claim 1 in which all of the ratchet gear means are similar, each having a cylindrical body telescopically mounted on the drive shaft means; in which axially extending slot means is formed in each of the cylindrical bodies; and in which a plurality of axially extending keys are mounted on the drive shaft means and extend into a respective cylindrical body slot means to permit axially sliding movement and to prevent rotation of the ratchet gear means with respect to the drive shaft means.

13. A chainless drive mechanism for a bicycle of the type having a pedal actuated crankshaft, and front and rear wheels rotatably mounted on a frame, said drive mechanism including:

a. a drive disc mounted on the pedal actuated crankshaft for rotation with the crankshaft, said drive disc being formed with at least one circularly arranged series of openings concentric to the crankshaft;

b. a driven disc mounted on the rear wheel of the bicycle for imparting rotation to said rear wheel, said driven disc being formed with at least one circularly arranged series of openings concentric to the axis of the rear wheel;

c. rigid drive shaft means extending between the drive and driven discs for transmitting the rotating force from the pedal actuated crankshaft to the rear wheel;

d. first gear means mounted on the drive shaft means and operatively engageable with the drive disc openings for imparting rotation to said first gear means and drive shaft means upon rotation of the drive disc in a forward direction;

e. second gear means mounted on the drive shaft means and engageable with the driven disc openings for rotating said driven disc and rear wheel upon rotation of the drive shaft and said second gear means;

f. the second gear means includes sprocket gear means rotatably mounted on the drive shaft means and drivingly engaged with the series of driven disc openings, and ratchet gear means operatively engageable with the sprocket gear means, said ratchet gear means being axially movable along the shaft means and rotatable with said shaft means;

g. the sprocket gear means and ratchet gear means each having teeth means concentric with the drive shaft means and in face-to-face relationship with respect to each other;

h. spring means biasing the teeth means into driving meshing engagement with each other during rotation of the drive disc in a forward direction to transmit the rotational force of the drive shaft means to the rear wheel through the operatively engaged teeth means of the sprocket and ratchet gear means and through the engagement of the sprocket gear means with the driven disc openings; and i. the teeth means of the ratchet and sprocket gear means being in slipping engagement with each other upon the drive shaft means becoming stationary during continued rotation of the rear wheel with the ratchet gear means overcoming the bias of the spring means and moving axially away from the sprocket gear means, permitting continued free rotation of the rear wheel upon stopping rotation of the pedal crankshaft and drive shaft means.

14. The mechanism defined in claim 13 in which the drive and driven discs are each formed with a pair of circularly arranged series of concentric openings; in which the first and second gear means each include a pair of sprocket gear means rotatably mounted on the drive shaft means and a pair of ratchet gear means rotatable with the drive shaft means and axially movable on said shaft means; in which each of the sprocket gear means has a series of circumferential sprocket teeth and a series of ratchet teeth means concentric with the drive shaft means, with said sprocket teeth being engaged with a respective one of the series of disc openings; in which the ratchet gear means each have ratchet teeth means concentric with the drive shaft means and in face-to-face relationship with a respective one of the sprocket gear means ratchet teeth means; and in which shift means is operatively engageable with the ratchet gear means for moving the teeth means of a selected ratchet gear means into meshing engagement with the series of ratchet teeth means of the associated sprocket gear means for obtaining different drive gear ratios.

15. The mechanism defined in claim 14 in which a plurality of axially extending keys are mounted on the drive shaft means; in which each of the ratchet gear means is formed with an axially extending slot; and in which each of the keys is slidably engaged within a respective one of the slots.

16. The mechanism defined in claim 14 in which the shift means includes a pair of brackets, each being respectively engaged with one of the pairs of ratchet gear means; and in which lever control means are mounted on the bicycle frame and are operatively engaged with the brackets for selectively moving said brackets to operatively engage a selected sprocket and ratchet gear means.

17. A multispeed, chainless drive mechanism for a bicycle of the type having a pedal actuated crankshaft, and front and rear wheels rotatably mounted on a frame, said drive mechanism including:

a. drive disc means mounted on the pedal actuated crankshaft for rotation with the chankshaft;

b. driven disc means mounted on the rear wheel of the bicycle for rotation with said rear wheel;

c. rigid drive shaft means extending between the drive and driven disc means for transmitting the rotating force from the pedal actuated crankshaft to the rear wheel;

d. a pair of first gear means mounted on the drive shaft means and selectively operatively engageable with the drive disc means for rotating the drive shaft means upon rotation of the drive disc means in a forward direction, with each of said gear means providing a different predetermined gearing ratio between the drive disc means and drive shaft means;

e. a pair of second gear means mounted on the drive shaft means and selectively operatively engageable with the driven disc means for rotating said driven disc means and rear wheel upon rotation of the drive shaft and said second gear means, with each of said gear means providing a different predetermined gear ratio between the drive shaft means and driven disc means; and f. each of the second gear means includes a sprocket gear rotatably mounted on the drive shaft means and drivingly engaged with the driven disc means, and a ratchet slip gear rotatable with the drive shaft means and operatively engageable with the sprocket gear for drivingly connecting the drive shaft means with the driven disc means during rotation of said shaft means and for simultaneously disengaging the driving connection between said sprocket gear and ratchet slip gear upon the drive shaft means becoming stationary.

18. The mechanism defined in claim 17 in which each of the first gear means includes a sprocket gear and a ratchet gear; in which each of the sprocket gears is rotatably mounted on the drive shaft means and formed with a series of circumferential teeth drivingly engaged with the driven disc means, and a second series of teeth concentric with the drive shaft means; in which each of the ratchet gears is formed with a series of teeth concentric with the drive shaft means and in face-to-face relationship with said second series of teeth of an adjacent sprocket gear; and in which shift means is operatively engaged with the ratchet gears for selectively moving the ratchet gear teeth into driving engagement with a second series of teeth of a respective sprocket gear.

19. The mechanism defined in claim 18 in which the shift means includes a bracket having a pair of legs, with each of said legs being engaged with a respective one of the ratchet gears for moving said ratchet gears axially on the drive shaft means into and out of driving engagement with a respective sprocket gear.

20. The mechanism defined in claim 17 in which a shift bracket is operatively engageable with the ratchet slip gears of the second gear means for selectively moving said ratchet slip gears into and out of driving engagement with the sprocket gears; and in which the shift bracket has spring means biasing the ratchet gears toward driving engagement with the sprocket gears.

* * * * *